June 23, 1970  E. A. PETROCELLI ET AL  3,517,121

ELECTRONIC PERISCOPE PANNING APPARATUS

Filed June 29, 1967  2 Sheets-Sheet 1

Edward A. Petrocelli
Joseph R. Owen
INVENTORS

BY John F. Miller

Agent

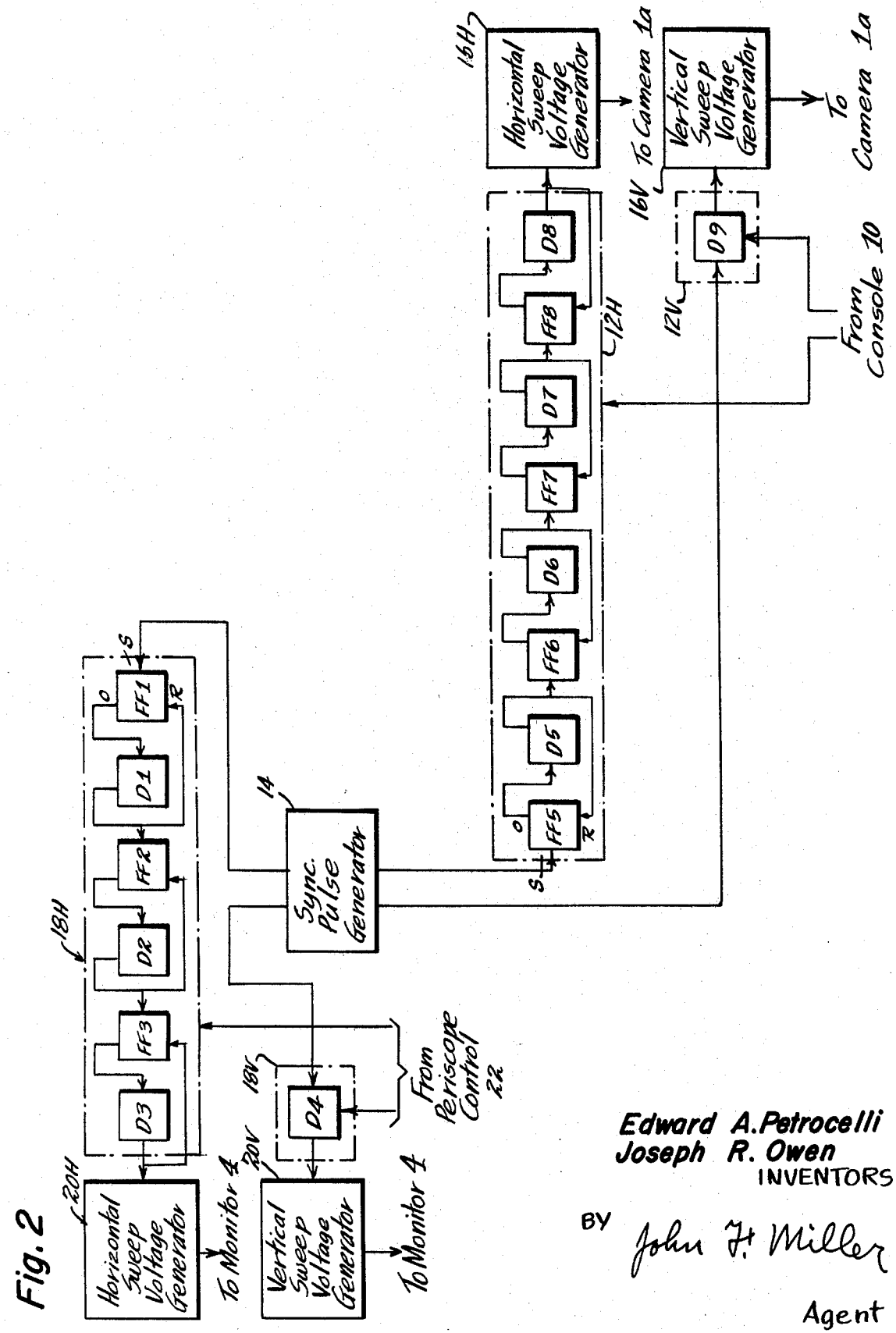

United States Patent Office 3,517,121
Patented June 23, 1970

3,517,121
ELECTRONIC PERISCOPE PANNING APPARATUS
Edward A. Petrocelli and Joseph R. Owen, Orlando, Fla., assignors to the United States of America as represented by the Secretary of the Navy
Filed June 29, 1967, Ser. No. 650,141
Int. Cl. H04n 7/18
U.S. Cl. 178—6.8                                      8 Claims

ABSTRACT OF THE DISCLOSURE

This invention concerns a training device wherein a plurality of TV cameras are arranged to scan a seascape background scene and one or more model ship targets, respectively. Camera video information is combined into a composite scene of a target ship or ships against the seascape background on a TV monitor which is built into a simulated submarine periscope. To a trainee peering into the periscope eyepiece, the scene on the TV monitor is similar to a real life scene observed through an actual periscope. An instructor may control adjustable delays in the sync pulse inputs of the sweep voltage generators of a target ship observing camera to cause movement of the ship on the TV monitor screen. Periscope controls are connected to adjust variable delays in the inputs to the sweep voltage generators of the TV monitor whereby a trainee may pan the periscope to follow and observe a moving ship.

CROSS REFERENCES TO RELATED APPLICATIONS

This application refers to copending application Ser. No. 580,835, now U.S. Pat. 3,420,953, by Hanns H. Wolff, filed Sept. 20, 1966, and titled "Apparent Target Motion Control." That application is a continuation-in-part of copending application Ser. No. 535,659, by Hanns H. Wolff, filed Mar. 14, 1966, and titled "Electronic Synthesizer."

BACKGROUND OF THE INVENTION

This invention is in the field of simulators with specific utility in training devices. In the prior art, various mechanical and electrical training devices have been built to simulate submarine periscopes in a marine environment. A trainee could acquire some dexterity and skill in the manipulation of periscope controls by using these prior art trainers without going abroad a real submarine. This effected a great saving of time, equipment, money, and personnel. However, the prior art devices were cumbersome, bulky, and expensive. The previously mentioned copending applications teach a compact and relatively inexpensive electronic system whereby a scene is displayed on a TV monitor built into a simulated periscope which realistically duplicates the view seen through a real periscope. The TV information is derived from a plurality of TV cameras, one of which scans a seascape background scene, while one or more other cameras scan model targets such as ships. The copending applications teach control means whereby an instructor can cause target ships to maneuver on the TV monitor screen. However, no means for panning the periscope were provided.

SUMMARY OF THE INVENTION

This invention provides a means for panning the simulated periscope of the copending Wolff applications so that a trainee may practice and become skilled in this necessary and essential art. This accomplishes the primary object of the invention, that is, to increase the realism and thus the effectiveness of the simulator taught by the parent applications.

The improvement is effected by substituting an improved variable delay for the fixed delay in the input circuits to the sweep voltage generators of the TV monitor. Panning controls on the simulated periscope are connected to these variable delays so that a trainee may track a moving ship which is controlled by an instructor.

BRIEF DESCRIPTION OF THE DRAWINGS

FIG. 2 shows the delay circuits of this invention.

DESCRIPTION OF THE PREFERRED EMBODIMENT

Figure 1:
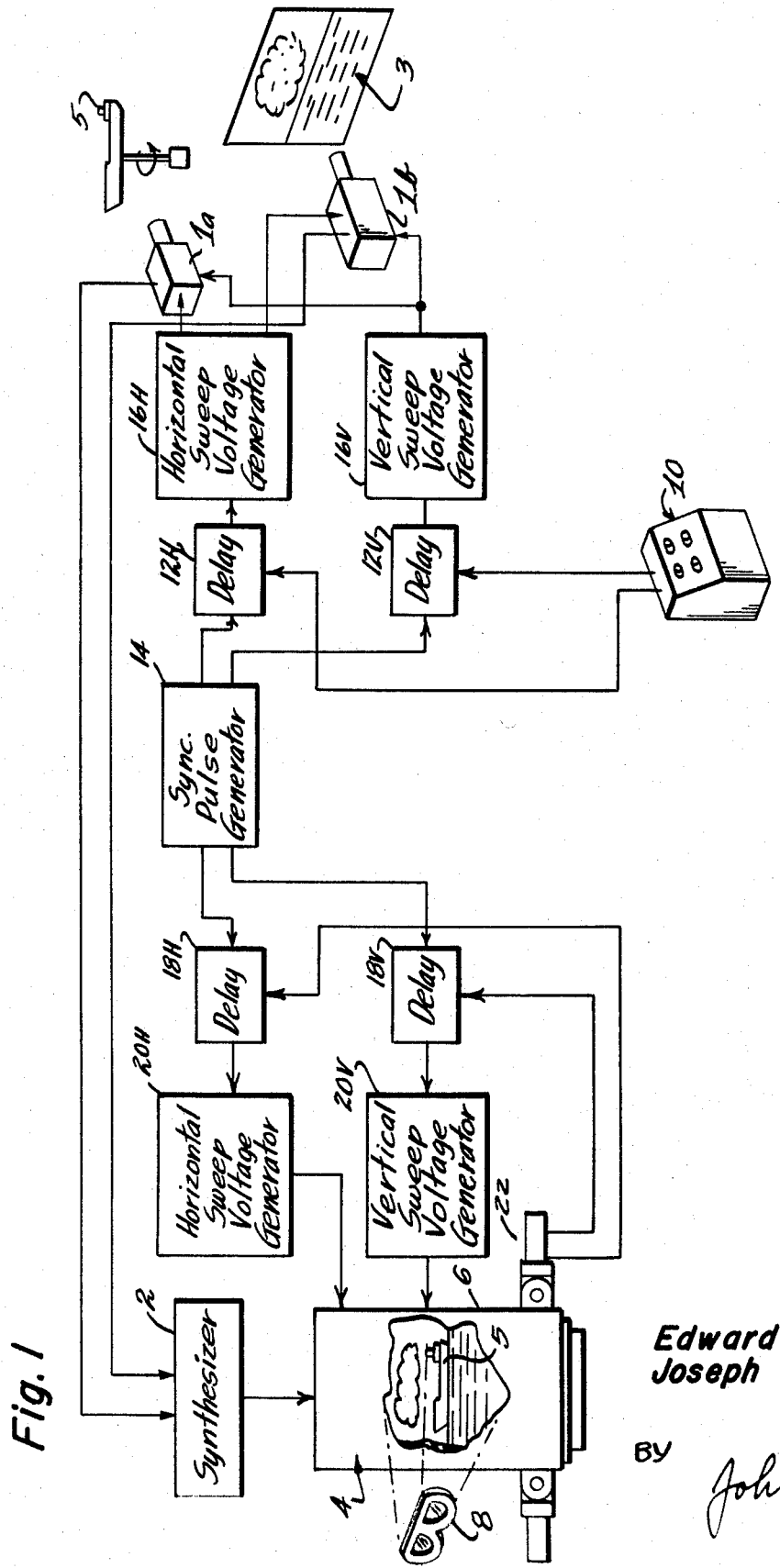
FIG. 1 shows the apparatus of this invention connected in the circuits of the Wolff inventions.

Some of the elements of the electronic synthesizer and the apparent target motion control are shown in FIG. 1. The basic circuits of the electronic synthesizer comprise a plurality of cameras such as cameras $1b$, $1a$, etc., which respectively scan background scenery 3 and a model of a target ship 5. Cameras $1a$ and $1b$ feed video information through a combining or synthesizer circuit 2 to a TV monitor 4 built into a simulated periscope 6. To a trainee looking through the eyepiece 8 of periscope 6, the ship target scanned by camera $1a$ appears as a ship against the background scanned by camera $1b$. Additional cameras and models may be used to insert additional targets into the seascape shown on TV monitor 4. An instructor may operate a control console 10 to adjust delay circuits 12H and 12V for camera $1a$. There pulse generator 14 and horizontal and vertical sweep voltage generators 16H and 16V for camera $1a$. There is, or was, prior to the present invention, a fixed delay in the TV monitor sweep circuits. This technique, taught in the "Apparent Target Motion Control" application, delays camera sync pulses with respect to monitor sync pulses and causes ship target 5 to move to the left or right and/or up or down against background 3. The trainee may practice periscope manipulation to observe the targets and thereby acquire a very necessary and highly critical skill.

The present invention greatly improves the operation and the utility of the basic inventions by substituting improved delay circuits 18H and 18V for the fixed delays previously connected between sync pulse generator 14 and the horizontal sweep voltage generator 20H and the vertical sweep voltage generator 20V for TV monitor 4. This makes it possible for the trainee to effectively "pan" periscope 6 by operating periscope controls 22. "Panning" refers to rotating or moving the periscope head to scan or sweep the observable area of the sea. This is necessary because a periscope has a more or less limited field of view. For example, to view all of the surrounding area, a periscope must be panned almost the entire 360 degrees. A primary object of the Wolff inventions is to facilitate the training of submarine personnel in the operation and manipulation of a periscope, since the safety of a submarine and crew depends on the skill and efficiency of the periscope operator. Therefore, the present invention, by making possible more realistic and complete training in the very basic and necessary operation of panning, greatly enchances the utility and value of the basic inventions.

In the Wolff application, it is explained that increasing the delay of the horizontal sync pulse to a ship target model observing camera, such as camera $1a$, will cause the ship target 5 to move to the right on the screen of monitor 4. We have discovered that by substituting our improved adjustable delays 18H and 18V for the fixed delay previously connected in the inputs of the sweep voltage generators 20H and 20V of the monitor 4, the effect of moving the target ship to the left on the TV monitor screen may be obtained. From the trainee's viewpoint, this has the effect of panning the periscope. The trainee's controls 22 which simulate actual periscope panning controls may be connected to vary delays 18H and 18V. Varying the delays in the camera and TV monitor vertical sweep circuits obviously has a similar effect on vertical target movement and panning. Of course, the delays in the camera circuits may be increased or decreased to move the ship right or left, and the delays in the monitor circuits may be increased or decreased to pan the periscope left or right.

Now referring to FIG. 2, an improved means for delaying the sync pulses to camera and monitor sweep voltage generators is shown. The delay circuit 18H for delaying sync pulses to the TV monitor 4 is comprised of a chain of flip-flops FF1, FF2, and FF3 interconnected by delay circuits D1, D2 and D3. A sync pulse from 14 is received at the set terminal S of flip-flop FF1. As FF1 is set, an output voltage appears at the output terminal O. This voltage traverses delay circuit D1 after a predetermined time and appears at the set terminal of flip-flop circuit FF2 and sets that circuit. The delay circuit D1 output voltage also is fed back to terminal R of flip-flop FF1 to reset that flip-flop. The output voltage from terminal O of flip-flop FF2 is fed to delay circuit D2 and the output of D2, after a predetermined delay, appears at the reset terminal R of flip-flop FF2 to reset that circuit. Flip-flop FF3 and delay D3 function in a similar manner. The output of D3 is connected to the input of horizontal sweep voltage generator 20H of TV monitor 4. The controls for the delays D1, D2 and D3 are ganged together so that periscope panning control 22 can control all three delays to obtain any desired delay up to a time equal to that required to scan two horizontal lines on the monitor screen. Since less vertical panning movement is required for the periscope, the delay 18V requires only one delay circuit D4.

The delay circuit 12H in the input to the horizontal sweep voltage generator 16H for camera 1a is similar to the delay 22H except that it uses four flip-flops FF5, FF6, FF7 and FF8 and four delay circuits D5, D7 and D8 to obtain a delay of the horizontal sync pulse equal to the time required for three horizontal line scans by the camera 1a. The delay for the vertical sync pulse requires only one delay circuit D9.

Thus, it may be seen that by the use of this invention, the electronic synthesizer of the Wolff inventions may be used to simulate a periscope with such exactness and completeness that a trainee may become highly skilled in all periscope operations without going aboard a submarine. The resulting savings in time, equipment, expense and lives of Naval personnel, is of incalculable value.

Many variations and modifications will suggest themselves to persons skilled in the art on reading the above disclosure. Therefore, the invention cannot be confined to the disclosed embodiment but is limited only by the following claims.

The invention described herein may be manufactured and used by or for the Government of the United States of America for governmental purposes without the payment of any royalties thereon or therefor.

What is claimed is:

1. In a simulator apparatus for a submarine training device wherein video information from a plurality of cameras is combined into a synthesized picture of target ships maneuvering against a seascape background on a TV monitor screen, said TV monitor being designed to simulate a submarine periscope, said cameras and said TV monitor being synchronized by sync pulses from a common sync pulse generator, the improvement comprising: adjustable delay means connected between said common sync pulse generator and the sweep voltage generators of said TV monitor, adjustable panning control means attached to said simulated submarine periscope, means connecting said panning control means to said adjustable delay means, said connecting means being such that when said adjustable panning control means are adjusted to pan said simulated periscope the delay of said adjustable delay means is simultaneously adjusted to create the effect of panning said synthesized picture on said TV monitor screen, whereby the visual effect of panning a real periscope is created.

2. The apparatus of claim 1, wherein a first of said adjustable delay means comprises a chain of flip-flops alternately interconnected with interposed delay circuits.

3. The apparatus of claim 2, wherein in said first adjustable delay means a first flip-flop is connected to receive a sync pulse from said common sync pulse generator, a first delay circuit is connected to transfer an output pulse from said first flip-flop to a second flip-flop, a second delay circuit is connected to transfer an output pulse from said second flip-flop to a third flip-flop and a third delay circuit is connected to transfer an output pulse from said third flip-flop to the horizontal sweep voltage generator of said TV monitor.

4. The apparatus of claim 3, wherein a feedback line is connected from the output of each said delay circuit to the reset input of the immediately preceding flip-flop in the chain.

5. The apparatus of claim 4, wherein a second adjustable delay means comprised of a single delay circuit is connected between said sync pulse generator and the input to the vertical sweep voltage generator of said TV monitor.

6. The apparatus of claim 5, wherein a third adjustable delay means comprised of four flip-flops alternately interconnected with interposed delay circuits is connected between said sync pulse generator and the horizontal sweep voltage generator of said ship target scanning camera.

7. The apparatus of claim 6, wherein a fourth adjustable delay means comprised of a single delay circuit is connected between said sync pulse generator and the vertical sweep voltage generator of said ship target scanning camera.

8. The apparatus of claim 7, wherein said third and fourth adjustable delay means are controlled by control means located at an instructor's console.

References Cited

UNITED STATES PATENTS

| | | | |
|---|---|---|---|
| 2,244,239 | 6/1941 | Blumlein. | |
| 2,611,819 | 9/1952 | Serrell. | |
| 2,851,519 | 9/1958 | Schira. | |
| 3,039,204 | 6/1962 | Bryan | 35—10.2 |
| 3,234,665 | 2/1966 | Sear | 35—25 |
| 3,324,251 | 6/1967 | Sichak | 333—29 |
| 3,368,034 | 2/1968 | Dischert. | |
| 3,420,953 | 1/1969 | Wolff | 178—6.8 |

ROBERT L. GRIFFIN, Primary Examiner

J. A. ORSINO, Jr., Assistant Examiner

U.S. Cl. X.R.

35—10.2, 25; 178—69.5